United States Patent [19]

Kashiwaya et al.

[11] 4,448,172

[45] May 15, 1984

[54] FUEL INJECTION APPARATUS

[75] Inventors: Mineo Kashiwaya; Kinsaku Yamada; Yoshiyuki Tanabe; Yoshishige Oyama, all of Katsuta; Hiroshi Kuroiwa; Hisato Tsuruta, both of Hitachi, all of Japan

[73] Assignee: Hitachi, Ltd., Tokyo, Japan

[21] Appl. No.: 380,339

[22] Filed: May 20, 1982

[30] Foreign Application Priority Data

May 22, 1981 [JP] Japan .................................. 56-78196

[51] Int. Cl.³ .............................................. F02M 51/00
[52] U.S. Cl. .................................... 123/494; 123/478
[58] Field of Search ............... 123/438, 470, 472, 478, 123/494, 585, 440

[56] References Cited

U.S. PATENT DOCUMENTS

| | | | |
|---|---|---|---|
| 3,776,208 | 12/1973 | Stumpp | 123/494 |
| 4,264,961 | 4/1981 | Nishimura et al. | 123/494 X |
| 4,292,945 | 10/1981 | Kiesling | 123/440 X |
| 4,364,354 | 12/1982 | Kosuge et al. | 123/438 X |
| 4,373,491 | 2/1982 | Knapp | 123/472 |
| 4,387,696 | 6/1983 | Yogo et al. | 123/472 X |

Primary Examiner—Tony M. Argenbright
Attorney, Agent, or Firm—Antonelli, Terry & Wands

[57] ABSTRACT

A fuel injection apparatus in accordance with the invention has a hot wire type sensor disposed in a bypass air passage and adapted to sense the flow rate of air in the bypass air passage. In order to absorb the pulsation of air flowing in the bypass air passage, the bypass air passage opens at its one end to the air cleaner of an intake system disposed in a portion upstream from the hot wire sensor. An orifice is disposed in a portion of the bypass air passage downstream from the hot wire sensor.

4 Claims, 4 Drawing Figures

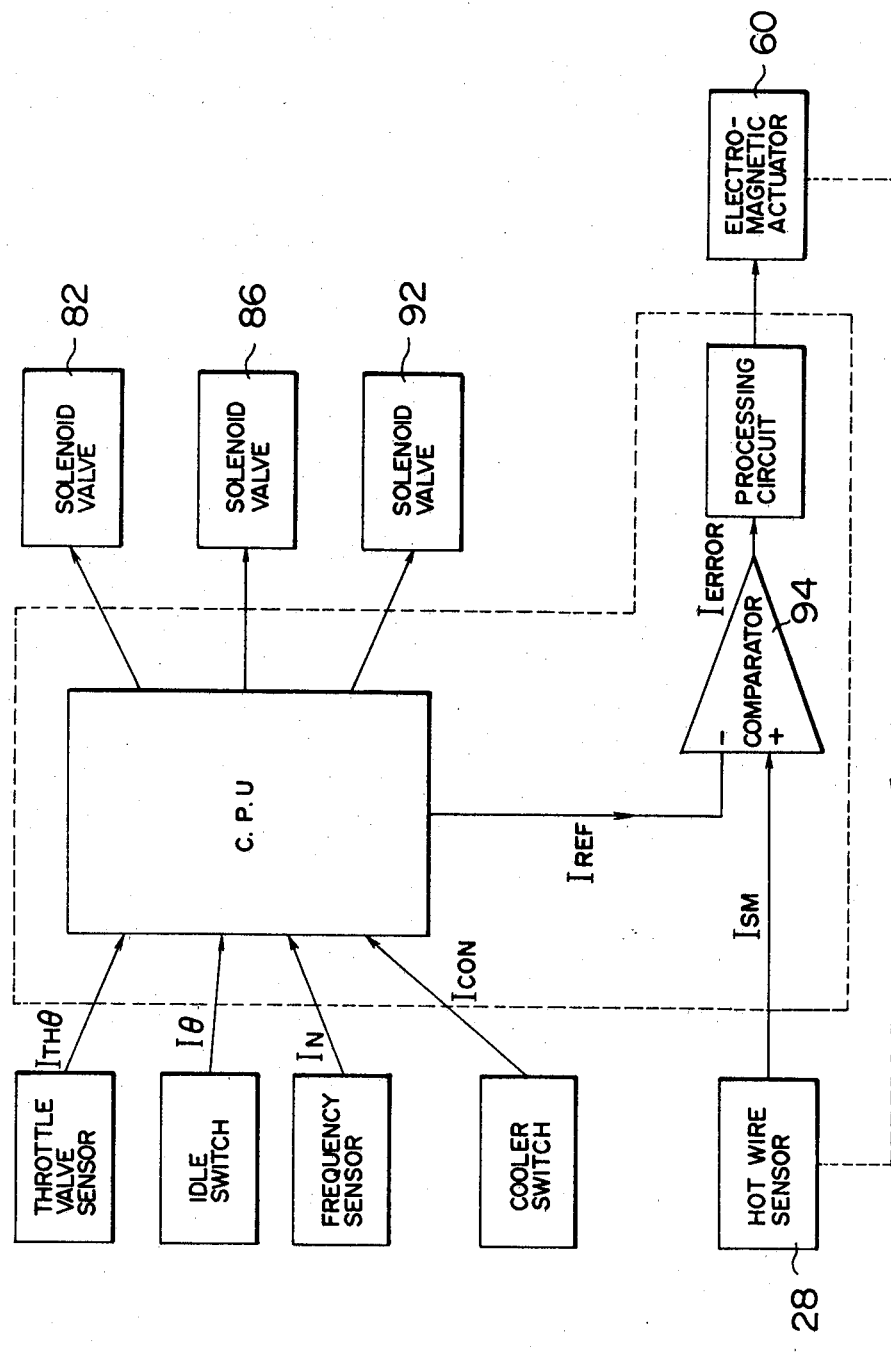

FUEL INJECTION APPARATUS

BACKGROUND OF THE INVENTION

The present invention relates to a fuel injection apparatus and more particularly to a fuel injection apparatus having an electric means adapted to control an electromagnetic actuator thereby to supply mixture gas of an air-fuel ratio optimum for an internal combustion engine.

DESCRIPTION OF THE PRIOR ART

Hitherto, in this field of technology, such a fuel injection apparatus has been proposed as having a bypass air passage opening at its one end to the venturi portion of an air intake passage and at its other end to a portion of the air intake passage upstream from the venturi portion and a sensing means disposed at a portion of the bypass air passage and adapted to sense a flow rate of air flowing through the bypass air passage. This fuel injection apparatus further has an electric means which is adapted to process electric signals representing states of an engine such as engine speed, throttle valve opening, idle opening and so forth and to output signals for driving respective actuators. A reference output signal $I_{REF}$ corresponding to the optimum air supply rate calculated from the states of the engine mentioned above is compared in a comparator with an output signal $I_{SM}$ from the sensing means representing the flow rate of air. The comparator then outputs a differential signal between these signals, i.e. an error signal $I_{ERROR}$. The error signal $I_{ERROR}$ is processed by another electric circuit which in turn outputs a control signal for making an actuator actuate a needle valve of an air flow metering means having an orifice and the needle valve and being disposed in the bypass air passage, thereby to make the flow rate of air in the bypass air passage optimum. This actuator actuates also a fuel metering means.

In the fuel injection apparatus of the type mentioned above, the output from the sensing means involves a pulsating component because the air in the bypass air passage flows pulsatilely, so that the output signal from the sensing means is often offset from the signal representing the actual air flow rate in the bypass air passage. Namely, the comparator compares the reference output signal $I_{REF}$ with an erroneous or wrong output signal $I'_{SM}$, so that the air flow rate is not actually optimized even though the electric circuits operate correctly to optimize the air flow rate. This problem is serious particularly when the sensing means incorporates a hot wire type sensor. Another drawback of the conventional apparatus is that since the needle valve of the air flow metering means and an actuating shaft of the actuator are formed integrally with each other the high precision is required in both of fabrication and assembling to attain an alignment between the orifice and the needle valve.

SUMMARY OF THE INVENTION

Accordingly, an object of the invention is to provide a fuel injection apparatus having a bypass air passage which is constructed to eliminate any pulsation of air flowing therethrough.

Another object of the invention is to provide a fuel injection apparatus in which the fabrication of the elements of metering means, as well as the assembling thereof, can be effected with a relatively low precision.

To these ends, a fuel injection apparatus in accordance with the invention has a bypass air passage which opens at its one end to the venturi portion of an air intake passage connecting an engine and an air cleaner and at its other end into the air cleaner or to the upstream side of the air cleaner. The bypass air passage incorporates an air flow metering means having an orifice and a needle valve. A sensing means for sensing the flow rate of air in the bypass air passage is disposed in a portion of the latter upstream from the air flow metering means. Preferably, the sensing means is a hot wire type sensor.

In the fuel injection apparatus of the invention having the above-explained features, although the air in the portion of the bypass air passage downstream from the sensing means involves a pulsation due to the influence of a pulsation in the venturi portion, such a pulsation is effectively damped by the orifice of the air flow metering means disposed between the sensing means and the venturi portion. In addition, since the portion of the bypass air passage upstream from the sensing means opens to the air cleaner with a relative large capacity or to the upstream side of the air cleaner, the air cleaner functions as a surge tank to absorb the pulsation.

These and other objects, features and advantages of the invention will become more clear from the following description of the preferred embodiment applied to an automotive engine, taken in conjunction with the accompanying drawings.

BRIEF DESCRIPTION OF THE DRAWINGS

FIG. 4 is a block diagram showing input and output signals associated with an electric means incorporated by the fuel injection apparatus shown in FIG. 1.

DESCRIPTION OF THE PREFERRED EMBODIMENT

Figure 1:
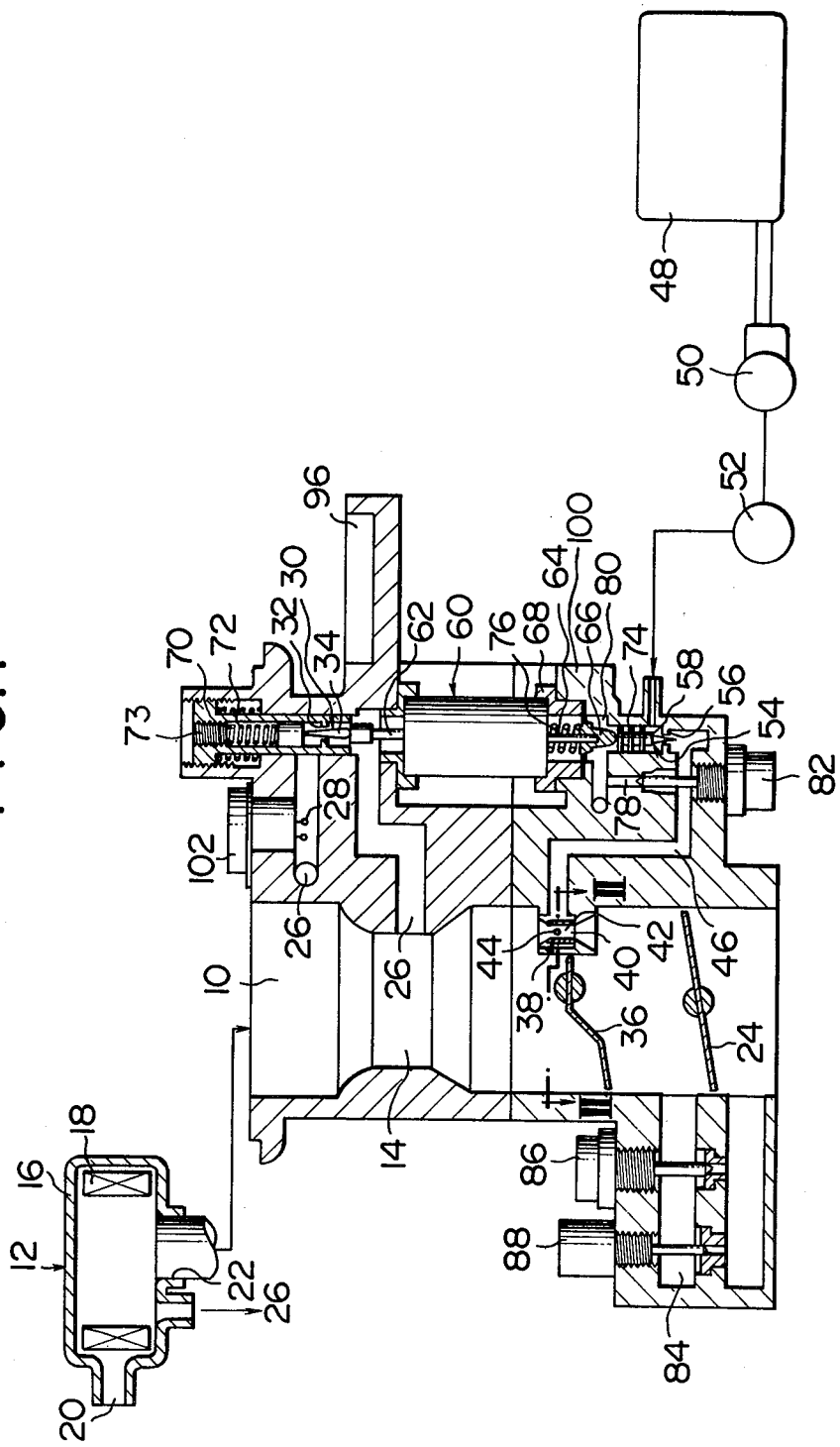
FIG. 1 is a sectional view of a fuel injection apparatus constructed in accordance with an embodiment of the invention.
Figure 2:
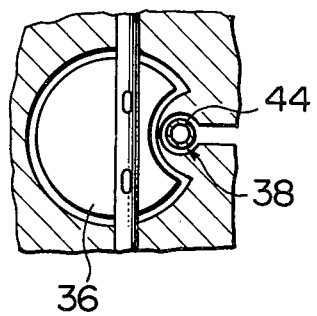
FIG. 2 is a fragmentary sectional view taken along the line II—II of FIG. 1.

Referring first to FIG. 1, a fuel injection apparatus in accordance with an embodiment of the invention has an air intake passage 10 which communicates at its one end with an air cleaner 12 and at its other end with an internal combustion engine which is not shown. The air intake passage 10 is provided with a venturi portion 14. The air cleaner 12 has an air cleaner housing 16 accommodating filters 18. The air cleaner housing 16 is provided with an air inlet port 20 and an air outlet port 22 adapted to engage the air intake passage 10. A throttle valve 24 operatively connected to an accelerator pedal is rotatably mounted in a portion of the air intake passage 10 downstream from the venturi portion 14. A bypass air passage 26 opens at its one end to the venturi portion 14 and at its other end to the portion of the air cleaner housing 16 upstream from the air outlet port 22 of the air cleaner 12. A sensing means disposed in the bypass air passage 26 has a hot wire type sensor 28 adapted for sensing the flow rate of air flowing in the bypass air passage 26. An air flow metering means 30 having an orifice 32 and a needle valve 34 is disposed in a portion of the bypass air passage 26 downstream from the sensing means. The orifice 32 and the needle valve 34 are in alignment and cooperate with each other in varying the area of passage for air. An auxiliary throttle valve 36 carried at an offset and adapted to be opened by the dynamic pressure of air is disposed at a portion of the air intake passage between the throttle valve 24 and the venturi portion 14. The auxiliary throttle valve 36 is notched at a peripheral portion thereof and engaged with a fuel injection means 38 projected radial inwardly from the inner peripheral surface of the air intake passage 10. The fuel injection means 38 is provided with a fuel injection passage 40 extending in parallel with the direction of flow of air and having a venturi portion 42. The venturi portion 42 is provided with a plurality of holes 44 radially opening in a plane perpendicular to the direction of flow of air. The fuel injection means 38 is communicated with a fuel tank 48 through a fuel passage 46. The fuel in the fuel tank 48 is pressurized by a pump 50 and pumped to the fuel injection means 38 through a regulator 52. A fuel metering means 54 having an orifice 56 and a fuel needle valve 58 is disposed in a portion of the fuel passage 46 upstream from the regulator 52. The orifice 56 and the fuel needle valve 58 are aligned and cooperate with each other in varying the area of passage for the fuel.

The air orifice 32, air needle valve 34, fuel orifice 56 and the fuel needle valve 58 have a common axis. An electromagnetic actuator 60 is diposed between the air flow metering means 30 and the fuel metering means 54 which are on the same axis. The actuator 60 has actuating shafts 62, 64 which project from both ends thereof. These actuating shafts 62, 64 are adapted to move in the same direction by a distance proportional to the level of the input signal to the actuator. The actuating shaft 62 is in contact with the air needle valve 34. A disc-like seal member 66 having a central projection is attached to an end portion of the actuating shaft 64. The seal member 66 is fixed at its outer peripheral portion to a main body 100 by means of a cap 68 so that an undesirable outward leak of the fuel from the main body 100 is avoided.

The projection is in contact with the fuel needle valve 58. Since the needle valves 34 and 58 are separate from the actuating shafts 62 and 64, it is possible to safely drive the metering means even if the actuator 60 fails to precisely align with the metering means 30 and 54. This in turn facilitates the assembling advantageously.

The air orifice 32 is provided with a hollow holder 70 having at its one end a peripheral male thread portion which engages with a female thread formed in the main body 100 to permit the movement of the holder 70 or air orifice 32 on the same axis line. A spring 72 imparting a predetermined load to the air needle valve 34 is provided in the holder 70. In the holder 70 mounted also is an adjuster 73 having an outer peripheral male thread and adapted to vary the predetermined load. On the other hand, annular flanges 74 are provided with an outer peripheral surface of the fuel needle valve 58 so as to form a labyrinth. The fuel needle valve 58 is biased upwardly by the pressure of fuel against the flanges 74 when the pump 50 operates. However, only a small force is required for moving the fuel needle valve 58 because the pressure of the fuel is negated by the force of the spring 76 disposed between the actuator 60 and the seal member 66.

A fuel return passage 78 extends from a portion of the fuel passage 46 downstream from the fuel metering means 54 to a chamber 80 defined by the top of the fuel needle valve 58 and the seal member 66. The overflowed fuel collected in the chamber 80 is returned to the fuel tank 48 through a pipe (not shown). Since the fuel return passage 78 extends in the direction opposite to the direction of force of gravity, it is possible to get rid of air bubbles in the fuel passage 46. A solenoid valve 82 is adapted to open the fuel return passage during deceleration of the automobile to permit the fuel to be returned to the fuel tank 48 but to normally close the fuel return passage 78.

A complemental air passage 84 provides a communication between a portion of the air intake passage 10 upstream from the throttle valve 24 and a portion of the same downstream from the throttle valve 24. A solenoid valve 86 is adapted to open the air passage 84 only when the air conditioner is driven, i.e. only when an additional load is applied to the engine. In addition, there is provided in the air passage 84 a valve 88 adapted to control the opening degree of the air passage 84 in response to the engine temperature through expansion and contraction of a thermo-wax incorporated therein. More specifically, the valve 88 operates to close the air passage 84 as the engine temperature rises.

Figure 3:
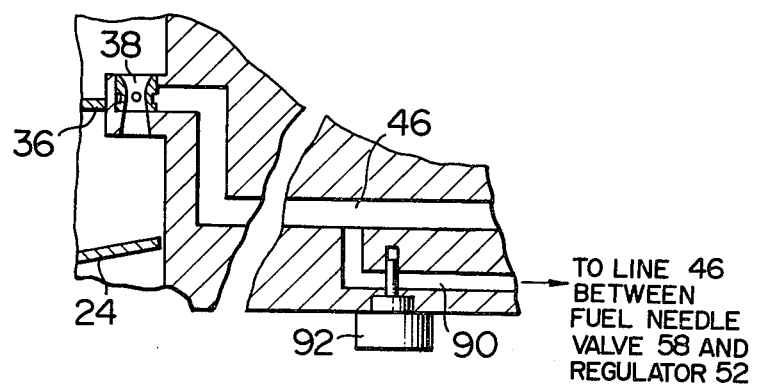
FIG. 3 is a fragmentary sectional view showing a fuel bypass passage.

Furthermore, as shown in FIG. 3, a fuel bypass passage 90 is formed in the fuel passage 46. A solenoid valve 92 for opening the fuel bypass passage 90 only during acceleration of the automobile is disposed at an intermediate portion of the fuel bypass passage 90.

The operation of the aforementioned construction will be explained hereinunder with reference to FIGS. 1, 3 and 4. As the engine is started, an air flows in the air cleaner 12 and the air intake passage 10. At this time, a pressure drop is caused around the venturi portion 14, so that the air is introduced into the venturi portion 14 through the bypass air passage 26. The air flow rate is sensed by a hot wire type sensor 28 and the output signal $I_{SM}$ corresponding to the air flow rate is delivered from a processing circuit 102 integrally attached to the main body 100 to the comparator 94. Simultaneously with the start up of the engine, a central processing unit (C.P.U.) 96 receives an output signal $I_{TH\theta}$ from a throttle valve sensor (not shown in FIG. 1) for detecting the opening degree of the throttle valve representative of the state of acceleration of the automobile, an output signal $I_\theta$ from an idle switch (not shown in FIG. 1) adapted to sense the state of idling representative of the state of deceleration of the automobile, an output signal $I_N$ from a rotational frequency sensor (not shown in FIG. 1) for sensing the engine speed, and an output signal $I_{CON}$ from a cooler switch (not shown in FIG. 1) adapted to sense whether the cooler is operating or not. It is possible to adopt another parameter for the purpose of correction. These signals are processed in the C.P.U. 96 which in turn outputs a reference signal $I_{REF}$ representing an optimum air flow rate and if desire, ON-OFF signals for driving the solenoid valves 82, 86 and 92. The reference signal $I_{REF}$ is delivered to the comparator 94. As the throttle valve 24 is closed to decrease the pressure drop in the venturi portion 14, the flow rate of air in the bypass passage 26 is decreased and the level of the output signal $I_{SM}$ from the hot wire type sensor 28 is lowered. In consequence, the electromagnetic actuator 60 is driven by means of a signal $I_{ERROR}$ from the comparator 94 and is actuated to put the air needle valve 34 downwardly as viewed in the drawings, thereby to increase the flow-rate of air in the bypass air passage 26. At the same time, the electromagnetic actuator 60 actuates the fuel needle valve 58 so that the fuel metering means 54 closes the fuel passage. At this time, the throttle valve 24 has been closed to decrease the flow rate of air supplied to the engine. Therefore, the longitudinal sectional shape of the fuel needle valve 58 is determined such that an air-fuel ratio approximating the stoichiometric air-fuel ratio is obtained with the decreased flow-rate of air. Then, as the throttle valve 24 is opened to increase the pressure drop in the venturi portion 14, the flow rate of air in the bypass air passage 26 is increased and the level of the output signal $I_{SM}$ from the hot wire type sensor 28 is raised. The electromagnetic actuator 60 is driven in accordance with the signal $I_{ERROR}$ which is the difference between the output signal $I_{SM}$ and the reference output signal $I_{REF}$ to raise the air needle valve 34 as viewed in the drawings to decrease the flow rate of air in the bypass air passage 26 to the level corresponding to the reference output signal $I_{REF}$. Simultaneously, the electromagnetic actuator 60 actuates the fuel metering means 54 to permit the supply of fuel at a rate corresponding to the increased air flow rate, i.e. the fuel needle valve 58 is raised in the drawings by the pressure of the fuel. The longitudinal-sectional shape of the fuel needle valve 58 is so determined as to provide an air-fuel ratio approximating the stoichiometric one in this state. At this time, the error signal $I_{ERROR}$ is processed by the processing circuit which delivers to the electromagnetic actuator 60 a pulse signal for precisely controlling a stroke of each actuating shaft of the electromagnetic actuator 60.

Thus, in the fuel injection apparatus of the invention, the electromagnetic actuator 60 is so driven as to make the actual air flow rate approach the optimum air flow rate, if the actual flow rate of air in the bypass passage 26 is deviated from the optimum air flow rate calculated by the C.P.U.. Simultaneously with the driving of the air needle valve 34, the fuel needle valve 58 is moved to provide an air-fuel ratio approximating the stoichiometric air fuel ratio.

What is claimed is:

1. In a fuel injection apparatus comprising:
   an air intake passage connecting an air cleaner housing air filters to an engine to be supplied with an air-fuel mixture gas;
   a venturi portion provided in said air intake passage;
   a throttle valve provided within a portion of said air intake passage downstream from said venturi portion;
   a bypass air passage one end of which opening into said venturi portion;
   a sensing means provided in said bypass air passage for sensing air flow passing therethrough;
   an air flow metering means disposed in a portion of said bypass air passage downstream from said sensing means and having an orifice and an air needle valve cooperating with the latter;
   a fuel injection means disposed within a portion of said air intake passage between said venturi portion and said throttle valve;
   a fuel passage through which a fuel from a fuel tank is pumped into said fuel injection means;
   a fuel metering means disposed in said fuel passage and having an orifice and a fuel needle valve cooperating with the latter;
   an electromagnetic actuator adapted for driving said air flow metering means and said fuel metering means; and
   electric means for controlling said electromagnetic actuator so as to control said air flow metering means and said fuel metering means;
   wherein the improvement comprises that the other end of said bypass air passage opens into a portion located upstream from one end of said air intake passage adjacent to said air cleaner.

2. A fuel injection apparatus according to claim 1, wherein said needle valves are aligned with said electromagnetic actuator at each side thereof and wherein said needle valves are driven by means of actuating shafts projecting from each end of said electromagnetic actuator, and said needle valves are separate from said actuating shafts.

3. A fuel injection apparatus according to claim 2, wherein said fuel needle valve is provided on its outer peripheral surface with annular flanges forming a labyrinth, and said fuel metering means further comprises a spring adapted to engage with said fuel needle valve and to act to negate a force acting on said fuel needle valve to bias the same toward said spring.

4. A fuel injection apparatus according to any one of claims 1 to 3, wherein said sensing means includes a hot wire type sensor.

* * * * *